(12) United States Patent
Leal Monteiro

(10) Patent No.: US 11,853,426 B2
(45) Date of Patent: *Dec. 26, 2023

(54) MOBILE COMMUNICATION PERIPHERAL, SYSTEM FOR PROTECTING A MOBILE TERMINAL AND COMMUNICATION METHOD

(71) Applicant: Vladimir Mickael Leal Monteiro, Saint Jean de Fos (FR)

(72) Inventor: Vladimir Mickael Leal Monteiro, Saint Jean de Fos (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,420

(22) Filed: Apr. 25, 2022

(65) Prior Publication Data

US 2022/0253530 A1 Aug. 11, 2022

Related U.S. Application Data

(62) Division of application No. 16/097,439, filed as application No. PCT/FR2017/051051 on May 2, 2017, now Pat. No. 11,341,243.

(30) Foreign Application Priority Data

Apr. 29, 2016 (FR) ...................................... 1653910

(51) Int. Cl.
*H04L 29/06* (2006.01)
*G06F 21/56* (2013.01)
(Continued)

(52) U.S. Cl.
CPC .......... *G06F 21/567* (2013.01); *G06F 16/182* (2019.01); *G06F 16/27* (2019.01);
(Continued)

(58) Field of Classification Search
CPC ........ G06F 21/567; G06F 21/32; G06F 21/81; G06F 21/85; G06F 21/86; H04L 63/0236; H04L 63/0861; H04L 63/107
See application file for complete search history.

(56) References Cited

U.S. PATENT DOCUMENTS

| 7,779,458 B1 * | 8/2010 | Heiderscheit | ....... | H04L 63/1416 |
| | | | | 726/11 |
| 2007/0039038 A1 * | 2/2007 | Goodman | ........... | H04L 63/1483 |
| | | | | 726/2 |

(Continued)

*Primary Examiner* — Evans Desrosiers
(74) *Attorney, Agent, or Firm* — Patshegen IP; Moshe Pinchas

(57) ABSTRACT

The portable peripheral (100) of communication with the data network (105) utilizing the internet protocol, comprises:
a connector (110) to mechanically connect and establish a removable wired connection between the peripheral and a portable terminal,
a first means (115) of wired bidirectional communication with the portable terminal,
a second means (120) of bidirectional communication with a data network and
a unit security (122) protecting the communication between the first and the second means of communication, this communication being established between the first and the second means of communication, the security unit (122) comprising a system (127) of autonomous DNS management,
the means of communication and the security unit being embedded in a unique housing (130) removable from the portable terminal.

22 Claims, 4 Drawing Sheets

(51) Int. Cl.
  *G06F 21/32*  (2013.01)
  *H04L 9/40*  (2022.01)
  *G06F 21/82*  (2013.01)
  *G06F 21/55*  (2013.01)
  *H04W 12/128*  (2021.01)
  *G06F 16/27*  (2019.01)
  *G06F 16/182*  (2019.01)
  *H04L 9/08*  (2006.01)
  *H04L 9/32*  (2006.01)
  *H04L 41/0806*  (2022.01)
  *H04L 41/00*  (2022.01)
  *H04L 61/4511*  (2022.01)
  *G06F 21/81*  (2013.01)
  *G06F 21/85*  (2013.01)
  *G06F 21/86*  (2013.01)
  *H04L 9/00*  (2022.01)

(52) U.S. Cl.
  CPC .............. *G06F 21/32* (2013.01); *G06F 21/55* (2013.01); *G06F 21/81* (2013.01); *G06F 21/82* (2013.01); *G06F 21/85* (2013.01); *G06F 21/86* (2013.01); *H04L 9/0838* (2013.01); *H04L 9/3226* (2013.01); *H04L 9/3239* (2013.01); *H04L 9/3247* (2013.01); *H04L 41/0806* (2013.01); *H04L 41/24* (2013.01); *H04L 61/4511* (2022.05); *H04L 63/0227* (2013.01); *H04L 63/0236* (2013.01); *H04L 63/0861* (2013.01); *H04L 63/107* (2013.01); *H04L 63/20* (2013.01); *H04W 12/128* (2021.01); *H04L 9/50* (2022.05); *H04L 2209/80* (2013.01)

(56) References Cited

U.S. PATENT DOCUMENTS

2014/0067756 A1* 3/2014 Stelman ................. G06Q 10/10
                707/E17.005
2014/0090046 A1* 3/2014 Touboul ................. H04L 63/20
                726/12
2020/0036707 A1* 1/2020 Callahan ................. H04L 67/53

* cited by examiner

MOBILE COMMUNICATION PERIPHERAL, SYSTEM FOR PROTECTING A MOBILE TERMINAL AND COMMUNICATION METHOD

INVENTION TECHNICAL FIELD

The present invention pertains to a portable communication peripheral, a protection system for a portable terminal and a communication method. It notably applies to Information Technology security.

BACKGROUND OF THE INVENTION

In the Information Technology security field, particularly for enterprises, administrations or organizations the data of which is sensitive, it is customary to advise against or even prohibit the use of personal computers by the personnel outside the enterprise's own data network. Indeed, such a data network, within the enterprise structure, is normally protected by a firewall that defends all the computers, within this network, from malicious attempts at information technology piracy.

Indeed, unsecured access to the internet, whether wired or wireless, entail, for instance, significant risks of intrusion or misdirection. Examples of such unsecured accesses typically comprise public Wi-Fi hotspots located in train stations, hotels or airports.

To date, there is no reliable and mobile solution, to provide secured access to unsecured networks for laptop computers.

Similarly, during a data transfer to and from a data storage peripheral and a mobile computer, the terminal can be infected by a malicious software, and, in turn, infect the entire network to which the computer belongs.

To date, there is no solution both reliable and mobile, to provide secured access to a resource of a data storage peripheral for laptop computers.

OBJECT OF THE INVENTION

The present invention purpose it to remedy all or part of these drawbacks.

To that end, a first aspect of the present invention covers a portable communication peripheral over a data network using the internet protocol comprising:
- a connector to connect physically and establish a removable wired communication between the peripheral and a portable terminal,
- a first bidirectional wired means of communication with the portable terminal,
- a second bidirectional means of communication with a data network and
- a unit to secure the communication between the portable terminal and the data network, this communication being carried out between the first and second means of communication, the security unit comprising an autonomous DNS management system.

the means of communication and the securing unit being embedded in a single housing removable from the portable terminal Thanks to these provisions, the embedded security unit, the software and hardware component of which are in the user's possession, allows to secure the access to the data network from the portable terminal.

Because the peripheral is portable, it is as mobile as the portable terminal is, and, because of advancements in information technology, le peripheral housing can be small enough to fit in a user's pocket for instance. Preferably, the peripheral housing has the same dimensions of a standard commercially available USB key. In variants, the peripheral additionally comprises means to attach the peripheral to the terminal by utilizing a magnet, a sticker, a clip or a suction cup to mention a few examples.

In certain embodiments, the security unit comprises a firewall filtering packets, received from the data network, intended for the portable terminal, comprising a computing unit configured to execute a firewall software.

These embodiments allow preventing intrusion risk types comprising lying DNS or man-in-the-middle by addressing communication packets directly to the intended address without depending on an external DNS.

In these embodiments, the peripheral that is the object of the present invention comprises, in the removable housing, a method of geolocating the peripheral, the firewall being configured to block packets received while the peripheral's location is not with a predetermined area.

These embodiments allow restricting the access to a data network within a predetermined area, such as, for instance an airport terminal or a hotel. Moreover, this glocalization feature allows tracking a lost or stolen peripheral.

In these embodiments the first means of wired communication comprises a USB connector.

These embodiments comprise the utilization of the most common connectivity method.

In these realization modes, the second communication method comprises an Ethernet connector.

These embodiments allow making a wired connection to a data network secure.

In certain embodiments, the second communication means comprises an antenna operating under to the IEEE 802.11 standard also known as "Wi-Fi"

These embodiments allow access, from the terminal, access to a data network, the Wi-Fi standard being widely adopted, particularly in public locations.

In these embodiments, the peripheral, object of the present invention, is configured to emit, while connected to the portable terminal, a deactivation command of a means of wireless communication of the portable terminal.

These embodiments allow limiting the risk of a dual connection to the data network, one being secured and the other not secured.

In these embodiments, the peripheral object of the present invention comprises:
an electronic lock preventing the peripheral to operate and a means to unlock the lock.

In these embodiments, the unlocking method is biometrical.

These embodiments allow only the authorized users to put the peripheral in operation.

In some embodiments, the second means of communication is configured, when an internet connection is established, to:
obtain the peripheral identification from a data server,
get the peripheral update files, the peripheral being configured to auto-update depending on the received files and
transmit, to the server, information depicting the path taken, by a packet sent by the second means of communication, to reach the server, the server being configured to validate or invalidate the connection depending on the path information transmitted.

In certain embodiments, the second means of communication is configured to, when an internet connection is validated, establish a data tunnel between the server and the peripheral.

In certain embodiments, the housing has a volume smaller than thirty-five cubic centimeters.

In certain embodiments, the peripheral, object of this invention, comprises a battery that supplies power to the peripheral electronic circuitry.

In certain embodiments, the peripheral electronic circuits are configured to receive power supply from the first means of power supply.

A second aspect of the present invention pertains to a portable peripheral communicating with a data storage peripheral comprising:
- a connector to mechanically connect and establish a removable wired communication between the peripheral and the portable terminal,
- a first means of wired bidirectional communication with the portable terminal,
- a second means of bidirectional communication comprising a USB connector and
- a unit securing the communication between the portable terminal and the storage peripheral, this communication being established between the first and the second means of communication, the means of communication and the security unit being embedded in a unique housing removable from the portable terminal.

These provisions allow preventing the execution of malicious software that can be present on the storage peripheral by dealing with this peripheral as a if it was a long-distance resource accessible on a data network.

A third aspect of the present invention pertains to a portable communication peripheral with a data storage peripheral or with a data network operating under the internet protocol, comprising:
- a connector to mechanically connect and establish a removable wired communication between the peripheral and a portable terminal,
- a first means of removable bidirectional communication with a portable terminal,
- a second means of wired bidirectional communication with a data storage peripheral or with a data network operating under the internet protocol,
- a unit securing the communication between the portable terminal and the data storage peripheral or the data network, this communication being established the first and the second means of communication and
- a means of authorizing the peripheral activation configured to activate the peripheral after a determined by the authorization means corresponds to a predetermined authorization information, the means of communication and the security unit being embedded in a unique housing removable from the portable terminal.

These provisions allow restricting the peripheral operation to the materialization of a particular condition that depends on the type of authorization implemented.

In certain embodiments, the means of authorization comprises:
- a means of entering a password,
- a near-field communication antenna or configured to receive information under the Bluetooth technology,
- a sensor of a user biometrics and/or
- the first means of communication to receive a portable terminal identifier.

A fourth aspect of the present invention pertains to a portable communication peripheral with a data storage peripheral or with a data network operating under the internet protocol, which comprises:
- a connector to mechanically connect and establish a removable wired communication between the peripheral and a portable terminal,
- a first means of bidirectional communication with the portable terminal,
- a second means of wired bidirectional communication with a data storage peripheral or with a data network operating under the internet protocol,
- a unit securing the communication between the portable terminal and the data storage peripheral or the data network, this communication being established the first and the second means of communication and
- an electrical power storage unit connected to at least one electronic circuit of the peripheral and configured, when electricity is transmitted to each said circuit, to cause the destruction of each said circuit, the means of communication and the security units being single embedded housing removable from the portable terminal.

These provisions allow to make the peripheral inoperable in case of, for instance, loss, theft or attempt of intrusion in the housing.

In certain embodiments, the electrical power stored in the storage unit is transmitted to each said circuit depending on a command received through the second means of communication.

In certain embodiments, the electricity stored in the storage unit is transmitted to each said circuit upon the detection of an integrity anomaly by the means of detection of integrity anomaly of the peripheral.

A fifth aspect of the present invention pertains to a portable peripheral communicating with a data storage peripheral or with a data network operating under the internet protocol comprising:
- a connector to mechanically connect and establish a removable wired communication between the peripheral and the portable terminal,
- a first means of wired bidirectional communication with the portable terminal,
- a second means of bidirectional communication with a data storage peripheral,
- a unit securing the communication between the portable terminal and the data storage peripheral or the data network, this communication being established between the first and the second means of communication, the security unit incorporating a means of encrypting data being transmitted by the second means of communication and a means of decrypting data received from the second means of communication and the means of communication and the security unit being embedded in a single housing removable from the portable terminal.

A sixth aspect of the present invention pertains to a portable peripheral communicating with a data storage peripheral or with a data network operating under the internet protocol comprising:
- a connector to mechanically connect and establish a removable wired communication between the peripheral and the portable terminal,
- a first means of wired bidirectional communication with the portable terminal,
- a second means of bidirectional communication with a data storage peripheral, a unit securing the communication between the portable terminal and the data storage peripheral or the data network, this communication being established between the first and the second means of communication, the data being transmitted through the second means of communication while being paired with an identifier on a blockchain, this identifier being managed according to electronic component identifiers of the peripheral and a unique predetermined identifier, and the means of identification and the security unit being embedded in a single housing removable from the portable terminal.

A seventh aspect of the present invention pertains to a protection system for a laptop terminal guarding against intrusions, incorporating:

a peripheral, object of the current invention and the portable terminal connected with a wire to the peripheral.

The purposes, advantages and specific characteristics of the system, object of the present invention being similar to that of the device object of the current invention, they are not repeated in this paragraph.

In certain embodiments, the portable terminal is configured to deactivate at least one means of wireless communication with the data network when the peripheral is connected to the portable terminal.

These embodiments allow limiting the risk of a dual connection to the data network, one of which being secured by the peripheral and the other not.

An eight aspect of the current invention pertains to a communication method with a data network operating under the internet protect, incorporating:

a stage of removable connection to a portable terminal of a removable housing of a peripheral object of the present invention, establishing a wired communication between the housing and the portable terminal, a first stage of bidirectional communication, by the peripheral, with the data network, a stage of filtering, by a firewall of the peripheral, of packets received from the data network and directed to the portable terminal connected via a wire to the peripheral and a second stage of wired bidirectional communication, with the portable terminal, of the packets not-filtered by the firewall.

The purposes, advantages and specific characteristics of the system, object of the present invention being similar to that of the device object of the current invention, they are not repeated in this paragraph.

BRIEF DESCRIPTION OF THE DRAWINGS

Other advantages, purposes and specific characteristics of the invention will appear from the following non-exhaustive description of at least one specific embodiment of the device, of the system and process, objects of the present invention, with regard to the drawings in annex, in which.

DESCRIPTION OF SAMPLE EMBODIMENTS OF THE INVENTION

The present description is not meant to be exhaustive; each characteristic of an embodiment can advantageously be combined with any other characteristic of any other embodiment.

It is to be understood immediately that the drawings are not to scale.

What is called a "portable terminal" in this document, is a device comprising a processing unit and a man-machine interface allowing the control of the processing unit. This portable terminal may or may not comprise a wired or wireless connector to a data network 105.

Figure 1:
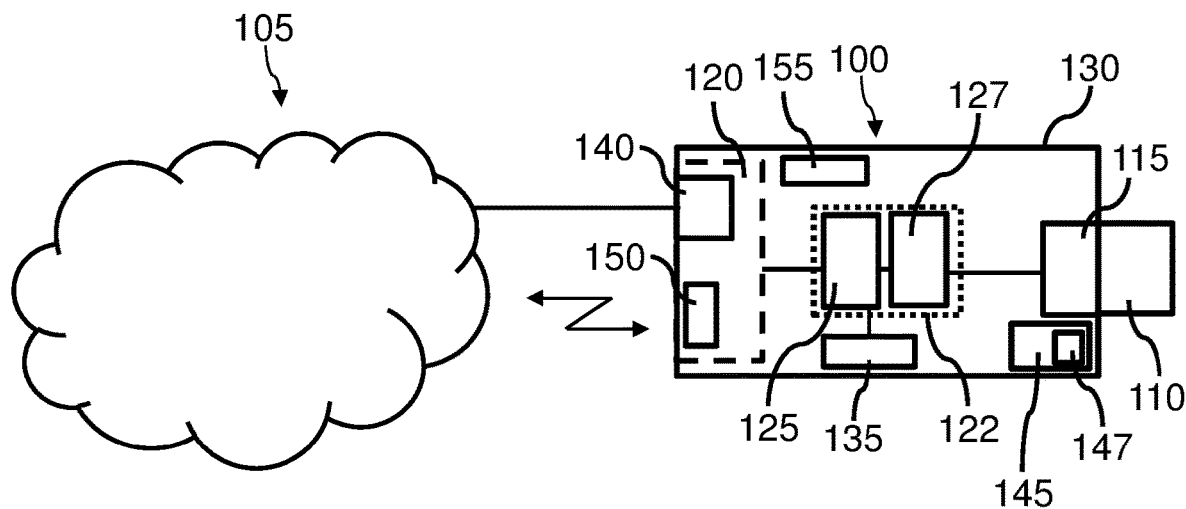
FIG. 1 represents, schematically, a first specific embodiment of the peripheral, object of the present invention

FIG. 1 depicts a schematic view of an embodiment of the peripheral 100, object of the present invention. This portable peripheral 100 featuring, among other functionalities, a communication with a data network 105 operating under the internet protocol, comprises:

a connector 110 to mechanically connect and establish a removable wired communication between the peripheral and the portable terminal, a first means 115 of wired bidirectional communication with the portable terminal, a second means 120 of bidirectional communication with a data storage peripheral, a unit 122 securing the communication between the portable terminal and the data network, this communication being established between the first and the second means of communication, the transmission being established through the second means of communication, the means of communication and the security unit being embedded in a single housing 130 removable from the portable terminal.

The data network 105 implemented here is the network called "internet", the architecture of which is broadly documented in prior art and in numerous publications of reference, is not described here.

The peripheral 100 is configured to be connected to the data network 105 in all commonly used fashions, whether with a wire or wirelessly.

In those variants where the peripheral 100 connects with a wire, the second means of communication 120 of the peripheral 100 comprises an Ethernet connector 140. This connector 140 is, for instance, an Ethernet female connector configured to connect to a cord called "RJ45". In certain variants, the connector 140 comprises both the female connector and a cord (not referenced) to connect to a female connector of the data network 105.

In the case of variants where the peripheral 100 connects wirelessly, the second means 120 of communication comprises an antenna 150 operating in compliance with the standard IEEE802.11 called "Wi-Fi". Wi-Fi antennae are largely described both in prior art and in specialized reference material, their implementation and operation details are not depicted here.

In variants, not depicted here, where the peripheral 100 connects wirelessly, the second communication method comprises an antenna 150 operating in compliance with the Bluetooth (registered trademark) standard. Bluetooth antennae are largely described both in prior art and in specialized reference material, their implementation and operation details are not depicted here.

This antenna 150 I configured to connect to a wireless access point (not represented here) of the data network 105. The data and parameters transferred to establish a connection between the peripheral 100 and the access point depend on the implementation specifics of the Wi-Fi or Bluetooth standards at this particular access point.

In certain variants, the second means of communication 120 comprises both a wired connection and an antenna for wireless connectivity to the data network 105.

In certain variants, the second means of communication 120 comprises:
multiple wired connectors and/or
multiple wireless antennae.

The peripheral 100 is connected to the portable terminal via the connector 110. The nature of this connector 110 depends on the nature of the target portable terminal when the peripheral 100 is being designed.

Preferably, this connector 110 is a male connector defined by the standard USB (also known as "Universal Serial Bus") configured to be inserted in a female USB port of the terminal.

This connector 110 physically links the peripheral 100 to the portable terminal, and concurrently, allows establishing a communication between this terminal and the peripheral 100.

In variants, the mechanical connector 110 and the communication link between the portable terminal and the peripheral are distinct entities.

The peripheral 100 communication with the portable terminal is made via the operation of the first means of communication 115.

The first means of communication 115 is for instance a network board associated with the USB connector of the peripheral 100.

The security unit 122 is an electronic circuit comprising at least one of the following elements:
a firewall 125 filtering packets received from the data network meant to be transmitted to the portable terminal comprising a processing unit configured to execute a firewall software and
a system 127 of autonomous DNS management.

The first means 115 and the second means 120 of communication can thus be located on each end of the firewall 125. This firewall 125 operates in compliance with predetermined security governance or policies set during the manufacturing of peripheral 100 and, potentially, during the connection of the peripheral 100 to a secure server (not represented here) of the manufacturer of peripheral 100.

This firewall 125 structurally functions like any existing firewall and already broadly described in reference publications.

The DNS management system 127 (DNS being also know as "Domain Name System"), comprises a registry of name translations into addresses on the data network 105. This system 127 is predetermined during the manufacturing of the peripheral 100 and is potentially updated upon the connection of the peripheral 100 to a secure server (not represented here) of the manufacturer of peripheral 100.

In a certain operating mode, the DNS management system 127 allow the direct acquisition of the address of a domain name for a transmission.

In another operating mode, the DNS management system 127 compares a recorded address corresponding to a domain name with a domain address received from an external DNS activated by the data network. If these two addresses are different, the communication with the data network is interrupted due to security concerns.

Means 115 and 120 of communication and security unit 122 are embedded in the unique housing 130 removable from portable terminal. Preferably, this housing 130 is designed to be hand-carried.

In preferential embodiments such as the one depicted in FIG. 1, the peripheral 100 comprises, inside the removable housing 130, a means 135 of geo-localizing the peripheral, the firewall 125 being configured to block any received packet when the peripheral location is not within a predetermined geographical area.

The geo-localization is, for instance, a beacon operating in compliance with the GPS system (also known as Global Positioning System). The predetermined geographical area is stored in a memory component (not depicted here) of the peripheral 100 during the manufacturing process of the peripheral 100, and is potentially updated upon the connection of the peripheral 100 to secure server (not represented here) of the manufacturer of the peripheral 100.

In preferential embodiments such as the one depicted in FIG. 1, the peripheral 100 is configured to transmit, upon connection to the portable terminal, a deactivation command via a wireless means of communication of the portable terminal.

This command is initiated by a processing unit of the peripheral 100 and transmitted via the means 115 of communication.

In certain embodiments, not depicted here, the peripheral 100 comprises a means of edifying a Virtual Private Network (also known as VPN) with a device on the data network 105. This means of edification is, for instance, a software embedded in a processing unit of the peripheral 100.

In embodiments such as the one depicted in figure one, the peripheral comprises:
an electronic lock 145 preventing the peripheral to operate and
a means 147 of unlocking lock 145.

The means of unlocking 147 is for instance a biometric identification system, a retina identification system or a fingerprint identification system.

In certain variants, the means of unlocking 147 is a communication chip utilizing a near-field wireless communication technology (also known as NFC), Bluetooth (registered trademark), or RFID (also known as Radio Frequency Identification).

In these variants, a third-party device, such as a communicating portable terminal, must be located in the proximity of peripheral 100 so that the peripheral 100 functions. This communicating portable terminal emits a signal incorporating a password or an identifier corresponding to a password or identifier registered by the lock 145.

In certain embodiments, as second communication means 120 is configured to, once an internet connection is established:
obtain the identification of the peripheral from a data server, receive update data files for the peripheral, the peripheral being configured to be updated depending on the files received and transmit, to the server, information representing the path taken by a data packet transmitted by the second means of communication to reach the server.

the server being configured to validate or not the connection depending on the transmitted path information.

The path information corresponds, for instance, to a function called "traceroute" allowing the identification of the cascade of routers between the peripheral and the server. In that way, if the path router corresponds to a router as malicious by the server, an identifier of said router being stored in a table of banned routers, for instance, the connection is invalidated.

In certain embodiments, the second means 120 of communication is configured, once an internet connection is validated, to establish a data tunnel between the server and the peripheral.

This data tunnel is established, for instance, via a VPN connection (VPN also known as Virtual Private Network).

In certain embodiments, the housing volume is smaller than thirty five cubic centimeters.

In certain embodiments, the housing volume is smaller than fifty cubic centimeters.

In certain embodiments, the peripheral comprises a battery 155 to supply power to the peripheral electronic circuits.

In certain realization modes, the electronic circuits of the peripheral are configured to receive power supply from the first means of power supply.

This power is supplied, for instance, via the power supply bus of a USB port operated via the second means 115 of communication.

Figure 4:
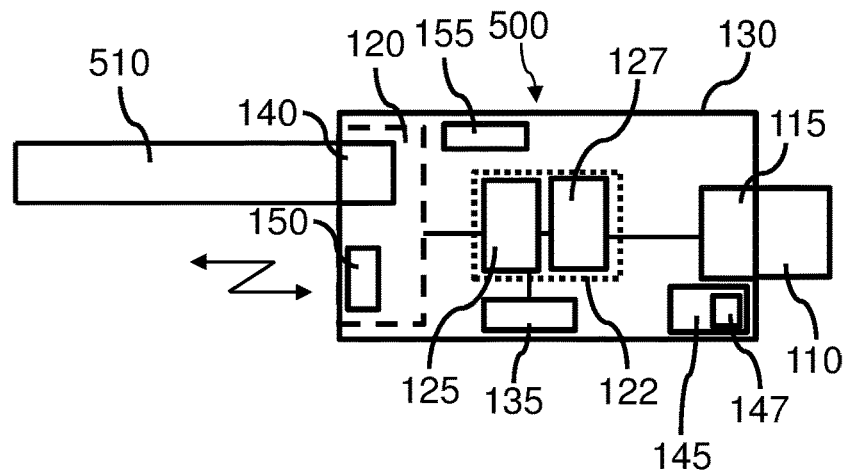
FIG. 4 represents, schematically, a second specific embodiment of the peripheral, object of the current invention.
Figure 8:
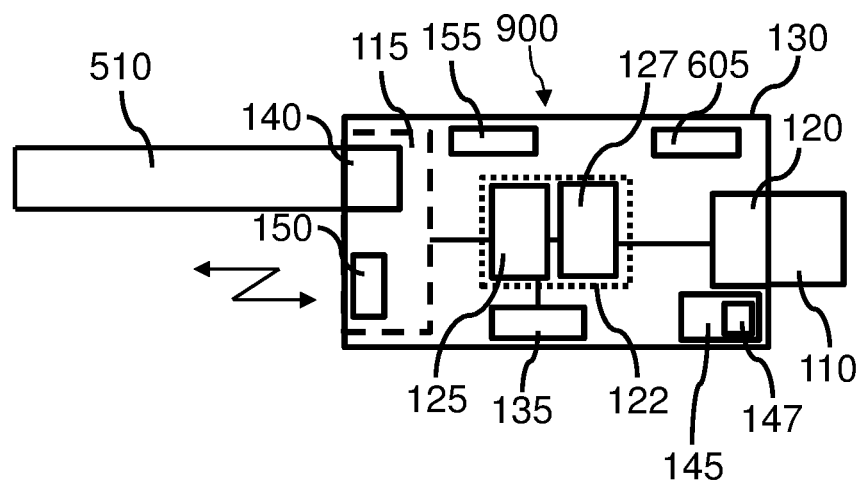
FIG. 8 represents, schematically, a sixth specific embodiment of the peripheral, object of the current invention.

FIGS. 4 and 8 depict other embodiments of the peripheral, object of the current invention.

Figure 5:
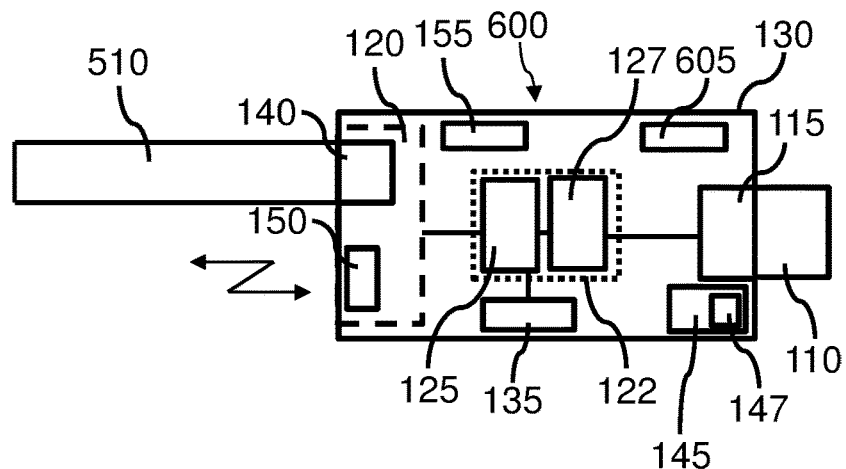
FIG. 5 represents, schematically, a third specific embodiment of the peripheral, object of the current invention.

FIG. 5 depicts a specific embodiment of the portable peripheral 500 communicating with a peripheral 505 of data storage, comprising:
- a connector 110 to mechanically connect and establish a removable wired communication between the peripheral and the portable terminal,
- a first means 115 of wired bidirectional communication with the portable terminal,
- a second means 120 of bidirectional communication with a data storage peripheral and
- a unit 122 securing the communication between the portable terminal and the data storage peripheral, this communication being established between the first and the second means of communication, the transmission being established through the second means of communication, the means of communication and the security unit being embedded in a single housing 130 removable from the portable terminal.

It is to be understood that the characteristics listed next to FIGS. 1 through 3 and 5 through 8 are compatible with this embodiment.

FIG. 5 depicts a particular embodiment of the portable peripheral 600 communicating with the storage peripheral 505 or with a data network 105 utilizing the internet protocol, comprising:
- a connector 110 to mechanically connect and establish a removable wired communication between the peripheral and the portable terminal,
- a first means 115 of wired bidirectional communication with the portable terminal,
- a second means 120 of bidirectional communication with a data storage peripheral or a data network 105 utilizing the internet protocol,
- a unit 122 securing the communication between the portable terminal and the data storage peripheral or the data network, this communication being established between the first and the second means of communication, the transmission being established the first and the second means of communication and
- a means 605 of authorizing the peripheral activation configured to activate the peripheral when an information determined by the means authorization matches a predetermined authorization data.

the means of communication and the security unit being embedded in a single housing 130 removable from the portable terminal.

In certain embodiments, the means of authorization 605 utilizes:
- a means of password entry such as a keyboard or a touchscreen for instance,
- a near-field communication configured to receive data via the Bluetooth technology,
- a sensor for a user's biometrics and/or
- the first means of communication to receive an identifier from the portable terminal, so that it only functions is paired with the peripheral for instance.

Note that all characteristics described next to FIGS. 1 through 4 and 6 through 8 are compatible with this embodiment.

Figure 6:
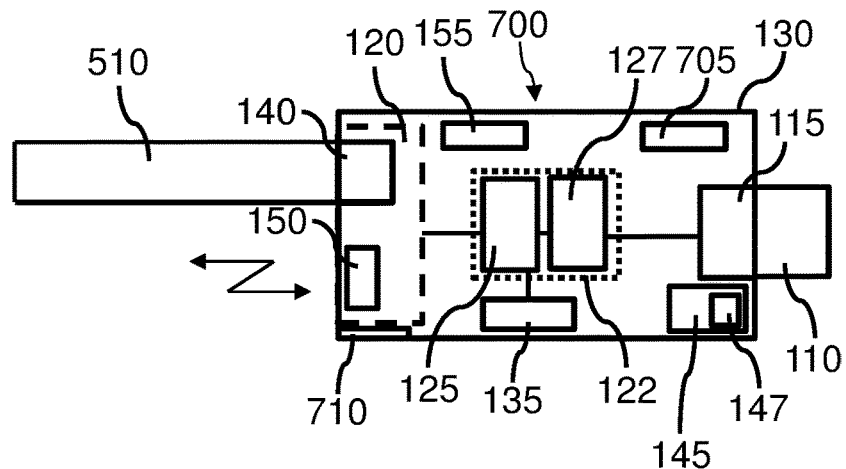
FIG. 6 represents, schematically, a fourth specific embodiment of the peripheral, object of the current invention.

FIG. 6 depicts a specific embodiment of the portable peripheral 700 communicating with a data storage peripheral 505 or with a data network 105 utilizing the internet protocol, comprising:
- a connector 110 to mechanically connect and establish a removable wired communication between the peripheral and the portable terminal,
- a first means 115 of wired bidirectional communication with the portable terminal,
- a second means 120 of bidirectional communication with a data storage peripheral or a data network 105, and
- a unit 122 securing the communication between the portable terminal and the data storage peripheral or the data network, this communication being established between the first and the second means of communication and
- a unit 705 of electricity storage connected to at least one electronic circuit of the peripheral and configured, when electricity is transmitted to each said circuit, to cause the destruction of each said circuit.

the means of communication and the security unit being embedded in a single housing 130 removable from the portable terminal.

The storage unit 705 is, for instance, comprised of condensers charged with a voltage greater than the operating voltage of the circuits of the peripheral, so that the electricity discharge causes the destruction of the circuits.

In certain embodiments, the electricity stored in the storage unit 705 is transmitted to each said circuit depending on a command received via the second communication method 120. This command is received, for instance, in lieu of update files.

In certain embodiments, the electricity stored in the storage unit 705 is transmitted to each said circuit upon the determination, by a detection means 710 of integrity anomaly of the peripheral, of the presence of an integration anomaly.

This integrity anomaly is, for instance, the detection of the housing being opened by a user. The means of detection 710 is then, for instance, a switch. Another integrity anomaly is, for instance, a contact of a circuit with a foreign object, via measurement of electrical currents or magnetic fields by the means of detection 710 for instance.

Note that the characteristics listed next to FIGS. 1 to 5 and 7 to 8 are compatible with this embodiment.

Figure 7:
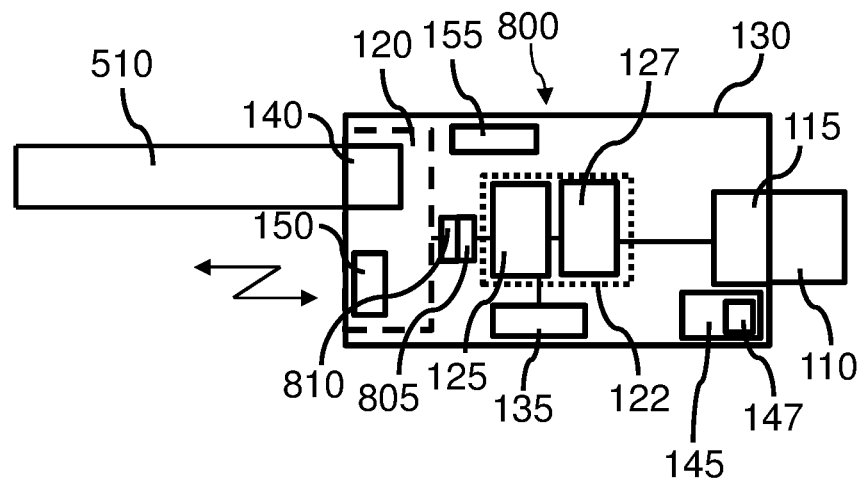
FIG. 7 represents, schematically, a fifth specific embodiment of the peripheral, object of the current invention

FIG. 7 depicts a specific embodiment of the portable peripheral 800 communication with a data storage peripheral 505 or with a data network 105 utilizing the internet protocol, comprising:
- a connector 110 to mechanically connect and establish a removable wired communication between the peripheral and the portable terminal,
- a first means 115 of wired bidirectional communication with the portable terminal,
- a second means 120 of bidirectional communication with a data storage peripheral or a data network 105,
- a unit 122 securing the communication between the portable terminal and the data storage peripheral or the data network, this communication being established between the first and the second means of communication, the security unit 122 comprising a means 805 of encrypting data being transmitted by the second means of communication and a means 810 of decryption of data received by the second means of communication and the means of communication and the security unit being embedded in a single housing 130 removable from the portable terminal.

The encryption means 805 and decryption means 810 are, for instance, electronic circuits configured for, based on an encryption key, encrypting and decrypting data. The encryption key can, for instance, be a key of a private/public key pair shared with the server.

Note that all characteristics listed next to FIGS. 1 to 6 and 8 are compatible with this embodiment.

FIG. 8 depicts a specific embodiment of the portable peripheral 900 communicating with a data storage peripheral 505 or with a data network 105 utilizing the internet protocol, comprising:
- a connector 110 to mechanically connect and establish a removable wired communication between the peripheral and the portable terminal,
- a first means 115 of wired bidirectional communication with the portable terminal,
- a second means 120 of bidirectional communication with a data storage peripheral,
- a unit 122 securing the communication between the portable terminal and the data storage peripheral or the data network, this communication being established between the first and the second means of communication, the data being transmitted by the second means of communication and being associated with an identifier on a blockchain, this identifier being generated in relation with identifiers of the peripheral's electronic component and a unique predetermined identifier, and the means of communication and the security unit being embedded in a single housing 130 removable from the portable terminal.

Note that all characteristics listed next to FIGS. 1 through 7 are compatible with this embodiment.

Figure 2:
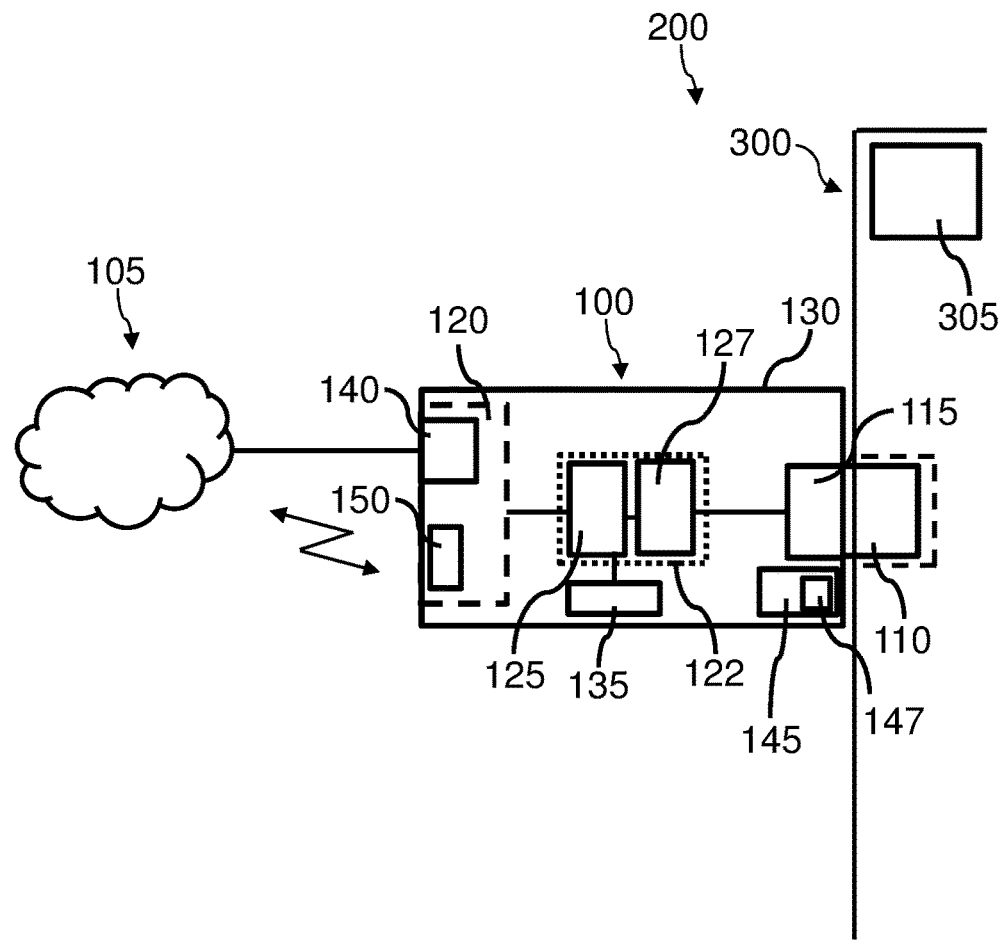
FIG. 2 represents, schematically, a specific embodiment, object of the current invention.

FIG. 2 depicts a schematic view of an embodiment of system 200, object of the present invention. This system 200 of protection of a portable terminal against intrusion comprises:
- a peripheral 100 as described next to FIGS. 1 through 8 and
- the portable terminal 300, connected, via a wire, to peripheral 100.

The connection between the peripheral 100 and the portable terminal 300 is made, via connections compatible with the USB standard, the peripheral 100 being equipped with a male USB plug and the terminal 300 being equipped with a female USB plug.

In the preferential embodiments such as the one depicted in FIG. 2, the portable terminal 300 is configured to deactivate at least one means 305 of wireless communication with the data network 105 when the peripheral is connected to the portable terminal.

The means 305 of communication is, for instance, an antenna configured for communications compliant with the Wi-Fi standard. The deactivation of this antenna causes the need for communications with the data network 105 to be undertaken via the peripheral 100. Hence, the communication between the portable terminal 300 and the data network 105 is secured as soon as the peripheral 100 is connected to the terminal 300.

Figure 3:
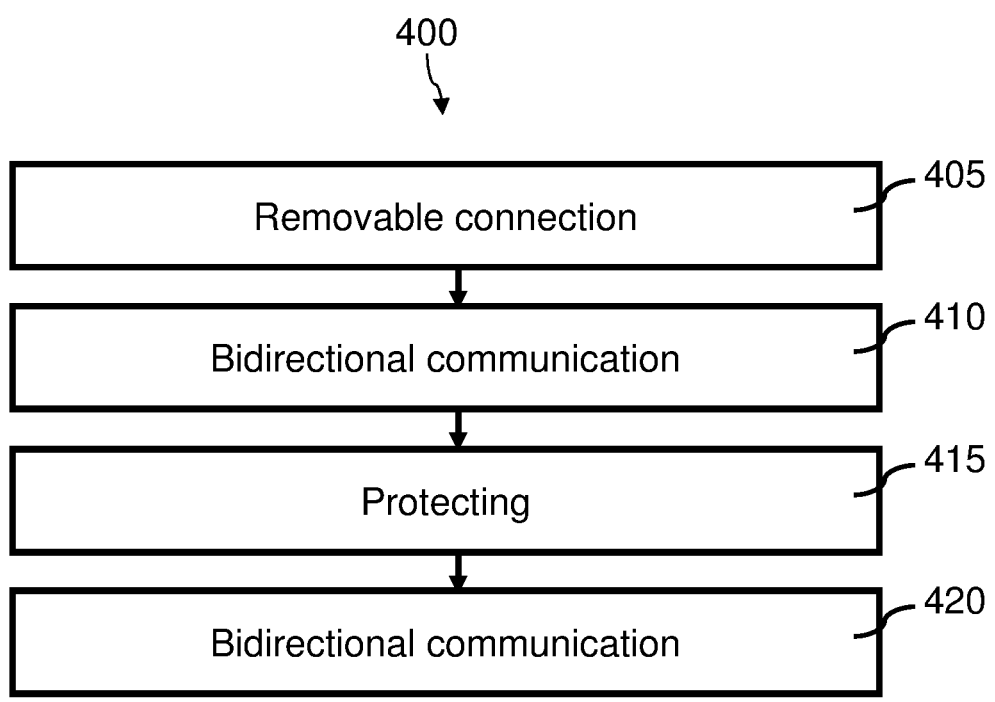
FIG. 3 represents, schematically and in the form of a flowchart, a series of specific stages of the process of the process, object of the current invention

FIG. 3 depicts a specific flowchart of stages of the process 400, object of the present invention. This process 400 of communication with a data network utilizing the internet protocol comprises:
- a stage 405 of removable connection, to a portable terminal, of the removable housing of a peripheral such as the one described next to FIGS. 1 through 8, establishing a wired communication and the portable terminal,
- a first stage 410 of bidirectional communication, by the peripheral, with the data network,
- a stage 415 of protecting the communication between the portable terminal and the data network and
- a second stage 420 of wired bidirectional communication, with the portable terminal, of packets not filtered by the firewall.

This process 400 is carried out, for instance, by the peripheral 100, object of the present invention.

Preferably, upstream from the process 400, all the portable terminal connections to the data network are deactivated, by turning the airplane mode on, for instance. In certain variants, the terminal causes the deactivation of all these connections upon plugging in the peripheral to the terminal.

Upon the peripheral connection, the peripheral scans the points of access to the data network if this peripheral utilizes a first means of wireless connection.

Each point of access to the network is displayed on the portable terminal, via an internet browser for instance. Upon the selection of one of these access points by a user, the peripheral connects to the corresponding access point.

In certain variants, the peripheral activation requires entering an identifier and a password on the portable terminal.

The invention claimed is:

1. Peripheral of communication with a data network utilizing the internet protocol, which comprises:
- a connector to mechanically connect and establish a removable wired communication between the peripheral and the portable terminal,
- a first wired bidirectional communicator with the portable terminal,
- a second wired bidirectional communicator with a data storage peripheral,
- a unit securing the communication between the portable terminal and the data network, this communication being established between the first and the second communicators, the security unit comprising an autonomous DNS system which updates a recorded address corresponding to a domain name upon connection of the peripheral to a secure server and compares the updated recorded address corresponding to a domain name with a domain address received from an external DNS activated by the data network, wherein if these two addresses are different, the communication with the data network is interrupted,
wherein the communicators and the security unit being embedded in a single housing removable from the portable terminal;
and wherein the data being transmitted by the second communicator being associated with an identifier on a blockchain, this identifier being uniquely generated depending on identifiers of electronical components of the peripheral and a predetermined unique identifier.

2. Peripheral according to claim 1, wherein the identifier associated with the data on a blockchain is unique and said identifier being uniquely generated depending on identifiers of each electronical components of the peripheral and the predetermined unique identifier.

3. Peripheral according to claim 1, in which the security unit comprises a firewall filtering packets, received from the data network and meant to be transmitted to the portable terminal, comprising a processing unit configured to execute a firewall software.

4. Peripheral according to claim 1, which comprises, in the removable housing, a geo-locator for geo-localizing the peripheral, the firewall being configured to block the packets received when the geo-localization of the peripheral is not within a predetermined geographical area.

5. Peripheral according to claim 1, in which the first communicator comprises a USB connector.

6. Peripheral according to claim 1, in which the second communicator comprises an Ethernet connector.

7. Peripheral according to claim 1, in which the second communicator comprises an antenna functioning according to the 802.11 standard also known as "Wi-Fi".

8. Peripheral according to claim 1, configured to send, upon connection with the portable terminal, a deactivation command of a means of wireless communication of the portable terminal.

9. Peripheral according to claim 8, that comprises:
an electronic lock preventing the operation of the peripheral and
a mechanism for unlocking the lock.

10. Peripheral according to the claim 9, in which the mechanism for unlocking is biometrical.

11. Peripheral according to the claim 1, in which the communicator is configured to, once an internet connection is validated, establish a data tunnel between the secure server and the peripheral.

12. Peripheral according to claim 1, that comprises a battery supplying power to the electronic circuits of the peripheral.

13. Peripheral according to claim 1, in which the electronic circuits of the peripherals are configured to receive power supply by the first power supply.

14. Peripheral according to claim 1, which comprises an electrical power storage unit connected to at least one electronic circuit of the peripheral.

15. Peripheral according to claim 1, which comprises an activator for activation authorization of the peripheral configured to activate the peripheral when an information determined by the activator corresponds to a predetermined activator.

16. Peripheral according to claim 1, in which the activator utilizes:
an interface for entering a password,
a near-field communication antenna or configured to receive data via the Bluetooth technology, a sensor of the biometric data of a user and/or
the first communicator to receive an identifier from the portable terminal.

17. Peripheral according to claim 1, which comprises an electrical power storage unit connected to at least one electronic circuit of the peripheral and configured, when electricity is transmitted to each said circuit, to cause the destruction of each said circuit.

18. Peripheral according to claim 17, in which the electricity stored in the storage unit is transmitted to each said circuit depending on a command received via the second communicator.

19. Peripheral according to claim 17, in which the electricity stored in the storage unit is transmitted to each said circuit when a detector for detecting of an integrity anomaly of the peripheral detects the presence of an integrity anomaly.

20. Peripheral according to claim 1, which comprises a unit securing the communication between the portable terminal and the data storage peripheral or the data network, this communication being established between the first and the second communicators, the security unit comprising a data encryptor being sent by the second communicator and a decryptor for decrypting the data received by second communicator.

21. Peripheral according to claim 1, which comprises a unit securing the communication between the portable terminal and the data storage peripheral or the data network, this communication being established between the first and the second communicator, the data being transmitted by the second communicator being associated with an identifier on a blockchain, this identifier being generated depending on identifiers of electronical components of the peripheral and a predetermined unique identifier.

22. Peripheral according to claim 1, in which the second communicator is configured when a connection to the internet is established, to obtain the secure server identification from a data server and receive update files, the peripheral being configured to update the recorded address corresponding to a domain name depending on the files received.

* * * * *